United States Patent [19]

Baziuk

[11] Patent Number: 5,618,075
[45] Date of Patent: Apr. 8, 1997

[54] MANUAL GRASPING AND LIFTING DEVICE FOR STONES AND THE LIKE

[75] Inventor: Morris Baziuk, Winnipeg, Canada

[73] Assignee: Flush Quip Inc., Winnipeg, Canada

[21] Appl. No.: 355,049

[22] Filed: Feb. 17, 1995

[51] Int. Cl.$^6$ .................................................. B25J 1/04
[52] U.S. Cl. ........................................ 294/19.1; 294/111
[58] Field of Search ........................ 294/1.4, 1.5, 19.1, 294/22, 50.6, 50.8, 111, 115, 117

[56] References Cited

U.S. PATENT DOCUMENTS

| | | | |
|---|---|---|---|
| 337,358 | 3/1886 | Allinson | 294/111 |
| 530,346 | 12/1894 | Leary | 294/111 |
| 2,429,884 | 10/1947 | Leigh | 294/111 |
| 3,071,401 | 1/1963 | Maierhofer | 294/111 |
| 4,114,938 | 9/1978 | Strader | 294/19.1 |
| 4,210,353 | 7/1980 | Koontz | 294/19.1 |
| 4,398,759 | 8/1983 | Manola | 294/1.4 |

FOREIGN PATENT DOCUMENTS 176891  7/1935  Switzerland ........................ 294/19.1

Primary Examiner—Dean Kramer
Attorney, Agent, or Firm—Adrian D. Battison; Murray E. Thrift

[57] ABSTRACT

A grabber for lifting particularly stones from the bottom of a manhole comprises a elongate handle with a lifthead at the bottom of a handle. The lifthead carries a pair of levers each pivoted to an outside corner of the lifthead and each carrying a grasping member hanging downwardly from the lift lever. The grasping member has three fingers which are inclined downwardly and outwardly and then downwardly and inwardly with a center finger having an end point further out than two side fingers. The side fingers incline outwardly and downwardly. A cable extending through the hollow handle wraps around pulleys on the lift levers so that upward pulling force on cable pulls the levers inwardly and grasps the stone.

19 Claims, 2 Drawing Sheets

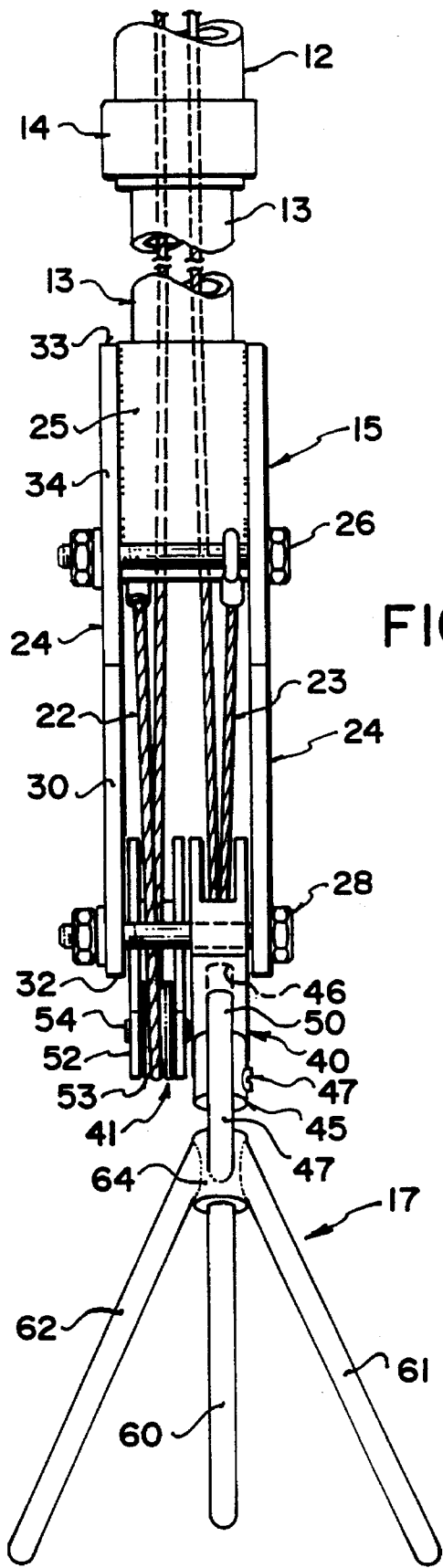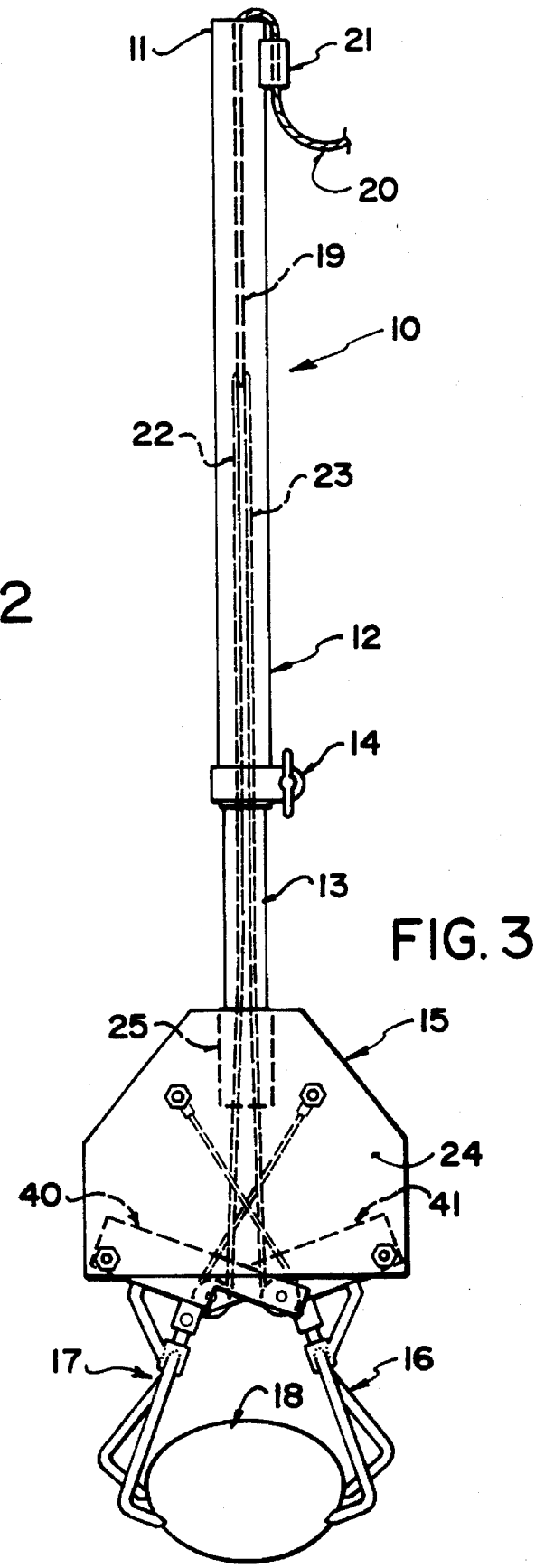
FIG. 2
FIG. 3

MANUAL GRASPING AND LIFTING DEVICE FOR STONES AND THE LIKE

BACKGROUND OF THE INVENTION

This invention relates to an apparatus for grasping and lifting objects such as stones and the like.

For the purpose of cleaning underground drains, it is often necessary to effect flushing of those drains to remove silt, stones and the like which tends to collect at the bottom of the drain and will eventually clog the drain if not regularly removed. For this purpose various cleaning nozzles have been developed which can be inserted into the drain to inject high pressure water streams into the drain to flush the silt along the drain to a point from which it can be removed.

In some cases relatively heavy objects particularly stones enter the drains and can collect with the silt. The silt and small stones can be lifted from the drain by a conventional suction system which vacuums the water, silt and lightweight material from the drain into a collection tank on a suction truck. However heavier stones cannot be lifted by the vacuum stream or in some cases are sufficiently large so that they cannot enter into the vacuum line which is generally at a diameter of the order of six to eight inches.

Up till now it has been necessary for an operator to enter the drain to manually grasp the stone and to lift it from the drain. This is of course highly inconvenient and can be dangerous so that it is much preferred if the stone can be lifted remotely from the ground surface by a device which is inserted into the drain and lifts the stone vertically upwardly. Up till now no device suitable for this purpose has been found by the present inventor on the marketplace and therefore the present inventor has developed a particular device which is used for grasping and lifting stones and similar objects from a remote location using a handle for manipulating the lifting device.

SUMMARY OF THE INVENTION

According to one aspect of the invention there is provided apparatus for grasping and lifting objects such as stones and the like comprising an elongate handle having a manually graspable upper end and a remote end, a lifthead attached to the remote end such that manual movement of the handle moves the lifthead to an object at a position remote from the upper end for lifting, a pair of grasping members of the lifthead for grasping the object, each grasping member being mounted on a respective one of two pivot levers each mounted on the lifthead for pivotal movement about a respective one of two parallel pivot axis of the lifthead, and flexible elongate lifting cable means for pivoting the pivot levers and therefore the grasping members from a first position in which the grasping members are spaced and opposed to a second position in which the grasping members are moved together to grasp the object therebetween for lifting, the cable means having one end at the upper end of the handle and an opposed end at the pivot levers for simultaneously pulling the pivot levers from the first position to the second position.

One embodiment of the invention will now be described in conjunction with the accompanying drawings in which:

BRIEF DESCRIPTION OF THE DRAWINGS

FIG. 2 is a side elevational view of the lifting head of FIG. 1.

FIG. 3 is a front elevational view similar to that of FIG. 1 on a smaller scale showing the whole device including the handle.

In the drawings like characters of reference indicate corresponding parts in the different figures.

DETAILED DESCRIPTION

Figure 1:
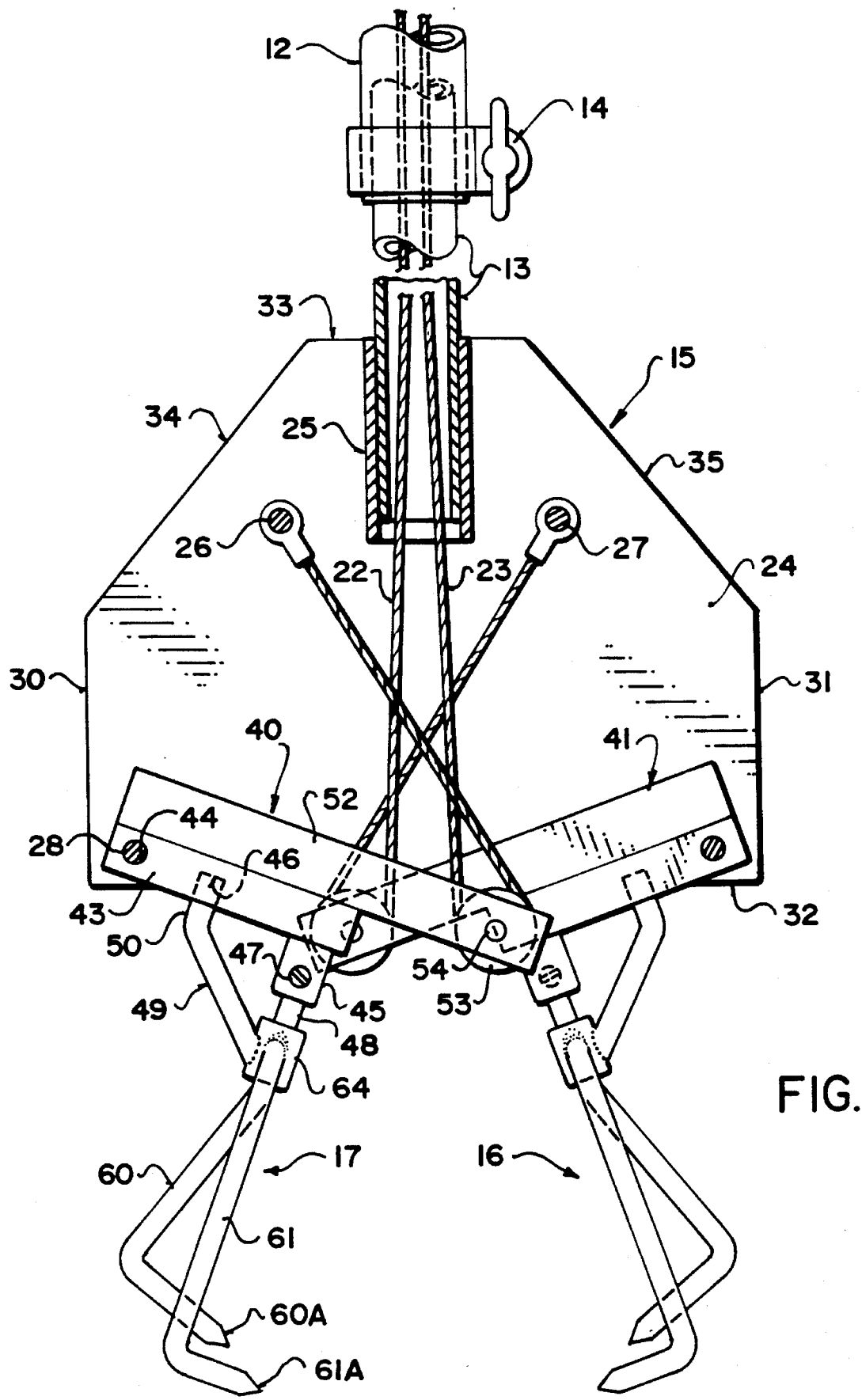
FIG. 1 is a front elevational view of the lifting apparatus with one plate of the lifting head removed to show the structure and operation of the grasping members.

Turning firstly to FIG. 3, the apparatus comprises a handle 10 having an upper end 11 by which the handle can be grasped and manipulated by an operator on the ground surface. The handle is formed in two tubular elements including an upper element 12 of larger diameter and a second lower element 13 of slightly smaller diameter so that the smaller tube can slide within the larger tube to provide adjustment in the length of the handle for storage and for operation at different depths from the ground surface. The two sections of the handle can be locked at a required length by any suitable mechanism and in the example shown there is included a wing nut 14 which operates to tighten a bifurcated lower end of the upper handle section 12 to pinch the lower around the lower section 13.

At the lower or remote end of the handle is provided a lifthead 15 which carries a pair of grasping members 16 and 17 for grasping a stone 18 or other object located underneath the lift head 15 and between the grasping members.

The grasping members are actuated by a cable means 19 positioned within the hollow interior of the handle. The cable means includes a single cable upper end 20 which emerges from the upper end 11 of the handle and can be pinched into place by a cleat 21 at the upper end of the handle. The single length of the cable connects to a pair of cable sections 22, 23 provided inside the handle with each of the cable sections extending to a respective one of the grasping members for simultaneous action of the grasping members in movement from a first open position to a second grasping position shown in FIG. 3.

The details of the grasping head are shown on an enlarged scale in FIGS. 1 and 2. The lift head 15 thus comprises two plates 24 which pinch between them a collar 25 into which an end of the handle portion 13 is inserted and retained by a screw fastener or the like. The collar 25 is welded to one of the plates and acts as a spacer to hold the plates at a required spacing. The plates are clamped together by four bolts, 26, 27, 28 and 29. The bolts 28 and 29 are arranged at sides 30 and 31 respectively of the plates and adjacent a bottom edge 32 of the plates. The bolts 26 and 27 are arranged in an upper part of the plates and spaced inwardly from the sides 30 and 31 to a position closely adjacent the collar 25. The plates includes a top edge 33 at the top of the collar 25 and chamfered or inclined side edges 34 and 35 which extend downwardly from the top edge to intersect with the vertical sides 30 and 31 at a position approximately the mid height of the plates. The plates are co extensive and parallel and supported in those positions by the coaction with the collar 25 and the bolts 26, 27, 28 and 29.

The collar 25 is open at its bottom end and similarly the tube forming the lower part 13 of the handle is open at its bottom end allowing the cable sections 22 and 23 to emerge from the bottom end into the space between the two plates 24 of the lifthead.

Each of the grasping members 16 and 17 includes a pivot lever 40, 41. The pivot lever 40 is mounted on the bolt 28 for pivotal movement about the axis defined by the bolt 28.

The pivot lever 41 is mounted on the bolt 29 for pivotal movement about the axis of the bolt 29. The pivot levers 40 and 41 are offset along the axis of the bolts so that one lies flat against one of the plates 24 and the other lies flat against the other of the plates 24 with the pivot levers overlapping in the centre section between the pivot axis.

Each pivot lever carries a lower lever part 43 in the form of a solid bar with a hole 44 at one end for receiving the bolt. On the bottom of the solid bar is provided a collar 45 with an axis of the collar lying at right angles to the bar. The bar also includes a hole 46 in its underside with an axis parallel to the axis of the collar and spaced along the bar toward the pivot axis. The collar 45 has a clamping screw 47 by which a rod 48 of the grasping member can be inserted into the hollow bore of the collar and clamped in place by the screw 47. At the same time the grasping member includes an inclined brace 49 which extends from the rod 48 rearwardly and upwardly toward the pivot pin and includes an end portion 50 extending into the hole 46 as a bracing element. The grasping member can therefore be pulled from the pivot lever simply by releasing the screw 47 and pulling the grasping member in a direction at right angles to the pivot lever so that the end portion 50 and the rod portion 48 are pulled along the axis of the hole 46 and the collar 45. With the grasping members so removed, the grasping members can of course be replaced by alternate shapes of grasping members for grasping other obstacles.

Each pivot lever further includes an upper part 52 welded to an upper edge of the bar 43 and extending therealong beyond the end of the bar 43. The upper part is bifurcated and defines a slot within which is received a pulley 53 rotatable on a pin 54 extending across between the two plates of the bifurcated section of the pivot lever. The pulley 53 thus rotates about an axis parallel to the pivot axis of the pivot lever. The pulley is arranged at an end of the pivot lever remote from the pivot axis. As shown in FIG. 1, the levers overlap so that the pulley of one lever is arranged beyond the pulley of the other lever so that it lies closer to the pivot axis of the other lever than to its own pivot axis.

Each pivot lever is therefore basically T shaped with the collar 45 arranged at a centre of the cross piece of the T and the rod 48 extending along the leg of the T. The pivot axis is then arranged at one end of the cross piece of the T and the pulley is arranged at the other end of the cross piece of the T.

Each cable 22, 23 extends from the hollow interior of the handle around the respective pulley and then passes from the respective pulley up to a loop around the respective one of the bolts 26, 27. In particular we noted in FIG. 1 that the cable extends from the handle to the side of the pulley which is closest to the centre of the lift head and then wraps around the pulley to the opposite side which is closer to the respective pivot axis and then extends upwardly from the pulley surface to the pin on the adjacent side of the collar 25.

Each of the grasping members includes three fingers 60, 61 and 62. The finger 60 forms an extension of the rod 48 and thus extends directly outwardly from the collar 45 at right angles thereto. The brace 49 is welded to a backside of the finger 60 at a coupling collar 64. The two side fingers 61 and 62 are welded to sides of the collar 64 and extend outwardly to respective sides of the centre finger 60 as shown in FIG. 2. The finger 61 and 62 thus are inclined outwardly from the collar 64. Also the fingers 61 and 62 are inclined slightly forwardly from the finger 60 so that in side elevation as shown in FIG. 1 the fingers 61 and 62 are forward of the fingers 60 at the outer ends thereof. Each finger includes a second portion substantially at right angles to the first portion thereof and inclined inwardly and downwardly in the initial position shown in FIG. 1. Because the finger 60 is slightly outward of the finger 61 and 62, the point 60A of the finger 60 is arranged slightly outwardly of the point 61A of the finger 61. This allows the fingers to grasp around a generally spherical object such as a stone with the finger point 60A spaced outwardly to accommodate the spherical surface of the object across the diameter of the object which is intended to be located along the plane containing the fingers 60.

In the initial relaxed position of the grasping members and their associated pivot levers, when the pivot lever and the grasping member are suspended from the pivot axis by gravity, the centre of gravity of the pivot lever and grasping member lies directly underneath the pivot axis. In this position the pivot lever is inclined in an inward and downward direction and the grasping member is inclined from the position on the pivot lever in a downward and outward position. In this relaxed position, therefore, the fingers of the grasping members are spaced since each is inclined outwardly and downwardly to a position just outside the position of the pivot axis.

In the position shown in FIG. 1, there is a slight tension on the cables so as to pull the pivot levers slightly upwardly to move from the initial position to a grasping position. If the cables were further released, however, the grasping member would move slightly outwardly to the initial position which is the widest position they attain and this is attained under gravity due to the position of the centre of gravity of the grasping members.

In operation, the handle is adjusted to the required length so that the upper end of the handle can be manipulated while the lifting head is positioned in the underground position for grasping and lifting a stone at the required depth.

The cable is released at this time so that the grasping members move to the initial position under gravity. The lifting head is then manipulated from the ground surface by moving the handle. When the grasping members are moved to the position surrounding the stone or other obstacle, the cable is pulled thus pulling the pivot levers upwardly about their respective pivot axes and drawing the grasping members inwardly to grasp around the stone. Once grasped, the cable is tied at the cleat at the handle holding the grasping members in place and allowing the whole of the unit including the obstacle to be lifted upwardly by manipulating the handle.

The grasping members including the three fingers can be removed and replaced by two finger grasping members of a similar type of construction for lifting smaller obstacles. In an alternative arrangement, the finger type grasping members can be removed and replaced by scoops shaped somewhat similar to the fingers but including blades at the lower end for grasping and scooping materials such as silt and small stones.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for grasping and lifting objects comprising:
    an elongate handle having a manually graspable upper end and a remote end;

a lifthead attached to the remote end such that manual movement of the handle moves the lifthead to an object at a position remote from the upper end for lifting;

a pair of grasping members of the lifthead for grasping the object;

two pivot levers each mounted on the lifthead for pivotal movement about a respective one of two parallel pivot axes of the lifthead, each pivot lever having a respective one of the grasping member mounted thereon;

and flexible elongate lifting cable means for pivoting the pivot levers and therefore the grasping members from a first position in which the grasping members are spaced and opposed to a second position in which the grasping members are moved together to grasp the object therebetween for lifting;

the cable means having one end at the upper end of the handle and an opposed end at the pivot levers for simultaneously pulling the pivot levers from the first position to the second position;

wherein the pivot axes are arranged at opposed sides of the lifthead and wherein each pivot lever extends from its respective pivot axis towards the opposite side of the lifthead;

and wherein the grasping member extends from the pivot lever downwardly and outwardly from a position spaced inwardly of the pivot axis such that, when the handle is arranged vertically upwardly from the lifthead, the grasping member is suspended downwardly from the respective pivot axis and moves to the first position under gravity.

2. The apparatus according to claim 1 wherein the cable means includes two cable portions at the lifthead, each cable portion extending from a position at the handle to a respective one of the pivot levers.

3. The apparatus according to claim 1 wherein the pivot axes are arranged at an end of the lifthead remote from the handle.

4. The apparatus according to claim 1 wherein the cable means is arranged to apply upward pulling force to the pivot lever at a position spaced along the pivot lever from the pivot axis beyond the grasping member.

5. The apparatus according to claim 4 wherein the pivot lever carries a pulley at an end thereof opposite to the pivot axis and wherein the cable means includes a portion thereof wrapped around the pulley and extending to an end of the cable means fixed to the lifthead.

6. The apparatus according to claim 1 wherein the pivot levers are offset axially of the pivot axes such that the pivot levers overlap between the pivot axes.

7. The apparatus according to claim 1 wherein each of the grasping members includes a pin extending into a collar carried on the respective pivot member which is readily removable from the collar of the pivot lever for replacement by an alternate grasping member.

8. The apparatus according to claim 1 wherein each grasping member comprises a plurality of fingers arranged substantially in a row along a line parallel to the respective pivot axis with each finger having a portion thereof extending away from the pivot lever substantially at right angles thereto and a second portion substantially at right angles to the first portion and extending inwardly toward the other of the grasping members.

9. The apparatus according to claim 8 wherein each grasping member comprises three fingers including a center finger lying in a vertical plane containing the pivot lever and two outer fingers each of which is inclined to a respective side of the vertical plane of the center finger.

10. The apparatus according to claim 1 wherein each grasping member comprises at least three fingers arranged substantially in a row along a line parallel to the respective pivot axis including at least one intermediate finger with the at least one intermediate of each grasping member being shaped so that an end point of the at least one intermediate finger is positioned at a distance further outwardly from the other of the grasping members than the two outer fingers.

11. The apparatus according to claim 1 wherein the grasping member includes a pin removably inserted into a collar on the pivot lever and a brace finger portion extending to a position spaced along the pivot lever from the collar.

12. The apparatus according to claim 1 wherein the lifthead comprises two parallel plates each on a respective side of the handle and receiving the handle therebetween, the pivot levers being mounted between the plates for pivotal movement about the pivot axes which are arranged at right angles to the plates at respective sides of the plates.

13. Apparatus for grasping and lifting objects comprising:

an elongate handle having a manually graspable upper end and a remote end;

a lifthead attached to the remote end such that manual movement of the handle moves the lifthead to an object at a position remote from the upper end for lifting;

a pair of grasping members of the lifthead for grasping the object;

two pivot levers each mounted on the lifthead for pivotal movement about a respective one of two parallel pivot axes of the lifthead, each pivot lever having a respective one of the grasping member mounted thereon;

and flexible elongate lifting cable means for pivoting the pivot levers and therefore the grasping members from a first position in which the grasping members are spaced and opposed to a second position in which the grasping members are moved together to grasp the object therebetween for lifting;

the cable means having one end at the upper end of the handle and an opposed end at the pivot levers for simultaneously pulling the pivot levers from the first position to the second position;

wherein each of the pivot levers includes a collar having a longitudinal axis extending downwardly from the respective pivot lever and wherein each of the grasping members includes a plurality of fingers for grasping the object and a pin extending from the fingers in a direction substantially opposite thereto into the collar carried on the respective pivot lever which pin is readily removable from the collar of the pivot lever for replacement by an alternate grasping member.

14. The apparatus according to claim 13 wherein each grasping member comprises a plurality of fingers arranged substantially in a row along a line parallel to the respective pivot axis with each finger having a portion thereof extending away from the pivot lever substantially at right angles thereto and a second portion substantially at right angles to the first portion and extending inwardly toward the other of the grasping members.

15. The apparatus according to claim 14 wherein each grasping member comprises three fingers including a center finger lying in a vertical plane containing the pivot lever and two outer fingers each of which is inclined to a respective side of the vertical plane of the center finger.

16. The apparatus according to claim 14 wherein each grasping member comprises at least three fingers arranged substantially in a row along a line parallel to the respective pivot axis including at least one intermediate finger with the at least one intermediate of each grasping member being shaped so that an end point of the at least one intermediate finger is positioned at a distance further outwardly from the other of the grasping members than the two outer fingers.

17. Apparatus for grasping and lifting objects comprising:

an elongate handle having a manually graspable upper end and a remote end;

a lifthead attached to the remote end such that manual movement of the handle moves the lifthead to an object at a position remote from the upper end for lifting;

a pair of grasping members of the lifthead for grasping the object;

two pivot levers each mounted on the lifthead for pivotal movement about a respective one of two parallel pivot axes of the lifthead, each pivot lever having a respective one of the grasping member mounted thereon;

and flexible elongate lifting cable means for pivoting the pivot levers and therefore the grasping members from a first position in which the grasping members are spaced and opposed to a second position in which the grasping members are moved together to grasp the object therebetween for lifting;

the cable means having one end at the upper end of the handle and an opposed end at the pivot levers for simultaneously pulling the pivot levers from the first position to the second position;

wherein each grasping member comprises at least three fingers arranged substantially in a row along a line parallel to the respective pivot axis including at least one intermediate finger and two outer fingers with each finger having a first portion thereof extending downwardly and outwardly away from the pivot lever and a second portion extending downwardly and inwardly toward the other of the grasping members to an end point, with the at least one intermediate finger of each grasping member being shaped so that the end point of the at least one intermediate finger is positioned at a distance further outwardly from the other of the grasping members than the two outer fingers.

18. The apparatus according to claim 17 wherein each finger has a portion thereof extending away from the pivot lever substantially at right angles thereto and a second portion substantially at right angles to the first portion and extending inwardly toward the other of the grasping members.

19. The apparatus according to claim 17 wherein each grasping member comprises three fingers including a center finger lying in a vertical plane containing the pivot lever and said two outer fingers each of which is inclined to a respective side of the vertical plane of the center finger.

* * * * *